US012755423B2

(12) United States Patent
Pollock et al.

(10) Patent No.: US 12,755,423 B2
(45) Date of Patent: Oct. 6, 2026

(54) SYSTEMS AND PROCESSES OF MOTION CAPTURE

(71) Applicant: Electronic Arts Inc., Redwood City, CA (US)

(72) Inventors: James Ray Pollock, New Westminster (CA); Natalya Renée Lazarich, Coquitlam (CA)

(73) Assignee: Electronic Arts Inc., Redwood City, CA (US)

( * ) Notice: Subject to any disclaimer, the term of this patent is extended or adjusted under 35 U.S.C. 154(b) by 184 days.

(21) Appl. No.: 18/902,509

(22) Filed: Sep. 30, 2024

(65) Prior Publication Data

US 2026/0094295 A1 Apr. 2, 2026

(51) Int. Cl.
*G06T 7/73* (2017.01)

(52) U.S. Cl.
CPC ...... *G06T 7/73* (2017.01); *G06T 2207/10024* (2013.01); *G06T 2207/30204* (2013.01)

(58) Field of Classification Search
None
See application file for complete search history.

(56) References Cited

U.S. PATENT DOCUMENTS 10,719,953 B1 * 7/2020 Ye .......................... G06T 7/246
2021/0343024 A1 * 11/2021 Wang ...................... G06T 7/292

FOREIGN PATENT DOCUMENTS

KR 20080083095 A * 9/2008 ....... G06K 19/06009
WO WO-2007025301 A2 * 3/2007 ............ G06T 7/251

OTHER PUBLICATIONS

T. Sueishi, H. Tochioka and M. Ishikawa, "High-speed Spin Measurement Method for Dotted Table Tennis Ball Using Structured Light of M-sequence Flickering Pattern," 2024 SICE Festival with Annual Conference (SICE FES), Kochi City, Japan, 2024, pp. 1188-1193. (Year: 2024).*

* cited by examiner

*Primary Examiner* — David Ometz
(74) *Attorney, Agent, or Firm* — Knobbe, Martens, Olson & Bear, LLP

(57) ABSTRACT

A motion capture object that includes the use of two types of markers for tracking and identifying motion capture objects within a motion capture environment. The system includes belt markers and motion capture markers. The belt markers are configured to divide the object into separate hemispheres (e.g., a first and second hemisphere). The motion capture markers in each hemisphere are positioned in different patterns. The motion capture markers in the first hemisphere are positioned in a first pattern that is unique to the first hemisphere. The motion capture markers in the second hemisphere are positioned in a second pattern that is unique to the second hemisphere.

20 Claims, 7 Drawing Sheets

SYSTEMS AND PROCESSES OF MOTION CAPTURE

BACKGROUND

Animation often includes characters that are representative of humans interacting with objects, such as during a sporting event. It is often desirable for animated characters to move similarly to corresponding real-world characters, for example, humans playing soccer or football. It is particularly desirable for many types of video games that the animation include objects (e.g., balls) that characters interact with in the motion capture environment. The interactions with objects can help make a videogame look as realistic as possible. Often, it can be difficult to capture realistic move of objects in motion during motion capture recording because the motion capture markers can interfere with the movement of the object. Additionally, it can be difficult to reliably track and determine the motion characteristics of the object, such as rotation.

SUMMARY OF EMBODIMENTS

The systems, methods and devices of this disclosure each have several innovative aspects, no single one of which is solely responsible for all of the desirable attributes disclosed herein. Details of one or more implementations of the subject matter described in this specification are set forth in the accompanying drawings and the description below.

In some aspects, the techniques described herein relate to a motion capture object including: a first hemisphere; a second hemisphere; a plurality of belt markers, wherein the plurality of belt markers are configured to divide the first hemisphere from the second hemisphere, wherein each of the belt markers has a first visual appearance; a first plurality of motion capture markers, wherein the first plurality of motion capture markers are positioned in a first configuration on the first hemisphere, wherein each of the motion capture markers of the first plurality has a second visual appearance; a second plurality of motion capture markers, wherein the second plurality of motion capture markers are positioned in a second configuration on the second hemisphere, wherein the first configuration and the second configuration are different, wherein each of the motion capture markers of the second plurality has the second visual appearance; wherein the plurality of belt markers, the first plurality of motion capture markers, and the second plurality of motion capture markers are configured to be detectable by motion capture cameras.

In some aspects, the techniques described herein relate to a motion capture object, wherein the first visual appearance is a first color and the second visual appearance is a second color. In some aspects, the techniques described herein relate to a motion capture object, wherein the first visual appearance and the second visual appearance are the same.

In some aspects, the techniques described herein relate to a motion capture object, wherein the first visual appearance and second visual appearance have different reflectivity.

In some aspects, the techniques described herein relate to a motion capture object, further including guidelines connecting at least a subset of the first plurality of the motion capture markers with each other and the plurality of belt markers, and the guidelines connecting at least a subset of the second plurality of the motion capture markers with each other and the plurality of belt markers.

In some aspects, the techniques described herein relate to a motion capture object, wherein the motion capture object is symmetrical about at least one centerline.

In some aspects, the techniques described herein relate to a motion capture object, wherein the motion capture object is spherical.

In some aspects, the techniques described herein relate to a motion capture object, wherein the motion capture object is non-spherical.

In some aspects, the techniques described herein relate to a motion capture object, wherein the motion capture object further includes a sensor configured to determine motion characteristics associated with the motion capture object.

In some aspects, the techniques described herein relate to a motion capture object, wherein the first configuration is a first plurality of triangles, and wherein the second configuration is a second plurality of triangles.

In some aspects, the techniques described herein relate to a motion capture object, wherein the first configuration and the second configuration are generated based on computer-based algorithm.

In some aspects, the techniques described herein relate to a computer-implemented motion capture method, the method including: acquiring motion capture data associated with a motion capture object having a first hemisphere and a second hemisphere, wherein the motion capture object includes: a plurality of belt markers, wherein the plurality of belt markers are configured to divide the first hemisphere from the second hemisphere, wherein each of the belt markers has a first visual appearance; a first plurality of motion capture markers, wherein the first plurality of motion capture markers are positioned in a first configuration on the first hemisphere, wherein each of the motion capture markers of the first plurality has a second visual appearance; a second plurality of motion capture markers, wherein the second plurality of motion capture markers are positioned in a second configuration on the second hemisphere; synchronizing the motion capture data from a plurality of motion capture cameras; determining motion characteristics associated with the motion capture object based at least in part on the plurality of belt markers, the first plurality of motion capture markers, and the second plurality of motion capture markers; and outputting the motion characteristics associated with the motion capture object.

In some aspects, the techniques described herein relate to a method, further including obtaining an identity associated with the motion capture object based at least in part on the first configuration and the second configuration.

In some aspects, the techniques described herein relate to a method, wherein the motion capture object is one of a plurality of motion capture objects, and wherein obtaining an identity associated with the motion capture object further includes determining the identity of each of the motion capture objects of the plurality of motion capture objects.

In some aspects, the techniques described herein relate to a method, wherein each motion capture object has a different first configuration and a different second configuration.

In some aspects, the techniques described herein relate to a method, wherein synchronizing includes accessing a global time code and associating the global time code with motion capture data associated with each of the plurality of motion capture cameras.

In some aspects, the techniques described herein relate to a method, wherein the motion characteristics include a location and orientation of the motion capture object in a coordinate space orientation.

In some aspects, the techniques described herein relate to a method, wherein the motion characteristics include derived motion characteristics including speed and rotation of the motion capture object.

In some aspects, the techniques described herein relate to a method, further including receiving data from a sensor embedded in the motion capture object.

In some aspects, the techniques described herein relate to a non-transitory computer storage media storing instructions that when executed by a system of one or more processors, cause the one or more processors to perform operations including: acquiring motion capture data associated with a motion capture object having a first hemisphere and a second hemisphere, wherein the motion capture object includes: a plurality of belt markers, wherein the plurality of belt markers are configured to divide the first hemisphere from the second hemisphere, wherein each of the belt markers has a first visual appearance; a first plurality of motion capture markers, wherein the first plurality of motion capture markers are positioned in a first configuration on the first hemisphere, wherein each of the motion capture markers of the first plurality has a second visual appearance; a second plurality of motion capture markers, wherein the second plurality of motion capture markers are positioned in a second configuration on the second hemisphere; synchronizing the motion capture data from a plurality of motion capture cameras; determining motion characteristics associated with the motion capture object based at least in part on the plurality of belt markers, the first plurality of motion capture markers, and the second plurality of motion capture markers; and outputting the motion characteristics associated with the motion capture object.

In some aspects, the techniques described herein relate to a method, further including obtaining an identity associated with the motion capture object based at least in part on the first configuration and the second configuration.

BRIEF DESCRIPTION OF THE DRAWINGS

Throughout the drawings, reference numbers are re-used to indicate correspondence between referenced elements. The drawings are provided to illustrate embodiments of the subject matter described herein and not to limit the scope thereof.

DETAILED DESCRIPTION OF EMBODIMENTS

Introduction

Figure 1:
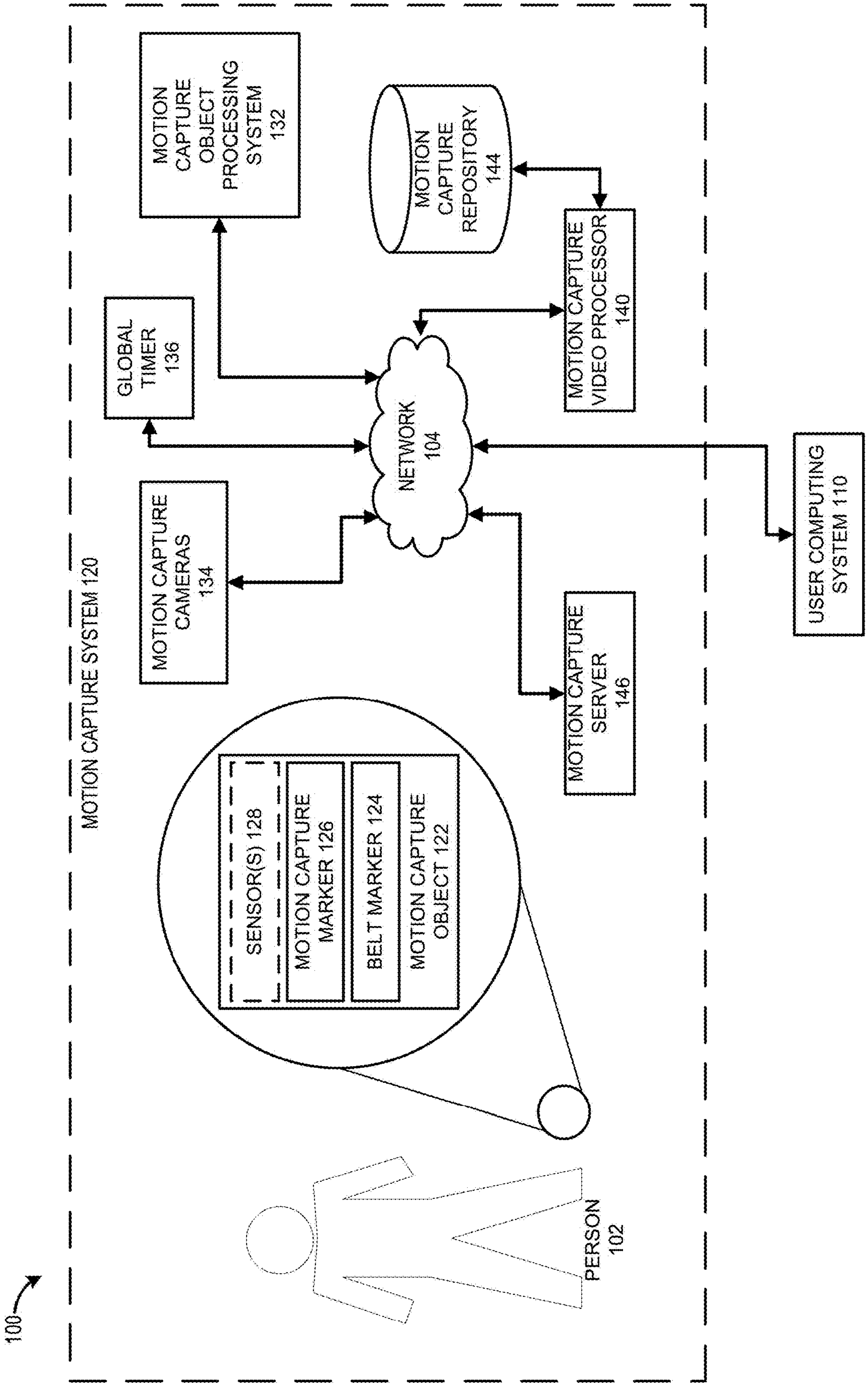
FIG. 1 illustrates an embodiment of a motion capture environment that can implement one or more embodiments of a motion capture system.

One method of obtaining motion capture data, which may be referred to as MOCAP data, is to position markers on a person or object, which may be recorded by one or more cameras. The motion capture markers may be positioned on a motion capture suit worn by the person or positioned on the object. The motion capture markers are often relatively large and can be detected by cameras or other image processing sensors. Based on the detection of the location of the markers in a coordinate space, motion of the person wearing the sensors can be determined. For example, based on the detection of a motion capture marker on an arm, it can be determined that the arm is moving and how the arm is moving. Due to asymmetry of motion capture markers positioned on the person, the system can generally determine positions and orientations of the body parts. The captured data and/or determined data may be included as part of the MOCAP data and can be used to create MOCAP animation data. The MOCAP animation data may be used to generate video or animation.

One problem with the use of the motion capture markers is that it can be difficult to reliably capture motion capture data associated with symmetrical objects, such as balls. The size of the objects and symmetry of the object make it difficult for the motion capture system to identify the object and determine any type of orientation of the object. For example, a soccer ball with motion capture markers positioned on the outer surface will generally appear the same from different points of view. The motion capture system may be able to determine a position of the object within the motion capture environment. However, motion characteristics such as rotation of the object cannot be detected using motion capture markers. Additionally, the size of the motion capture markers can prevent or makes their use impractical for detecting the motion of objects within the motion capture environment. Additionally, during rotation of the object, many of the motion capture markers may easily be occluded which can lead to marker swapping, or merging. Marker swapping may occur when two or more markers are physically close enough to one another, or a pattern of motion capture markers is similar enough to another cluster of motion capture markers, that the motion capture system incorrectly tracks the object resulting in data loss.

A solution is to create a motion capture pattern that provides a distinct pattern that is readily identifiable by the motion capture system during operation. The solution disclosed herein includes the use of two types of markers for tracking and identifying motion capture objects within a motion capture environment. The system includes belt markers and motion capture markers that can have different visual appearances. For example, the belt markers may be a first color and/or material, and motion capture markers may be a second color and/or material. In some embodiments, the belt markers and the motion capture markers can be the same color and/or material. The belt markers are configured to divide the object into separate hemispheres (e.g., a first and second hemisphere). The motion capture markers in each hemisphere are positioned in different patterns. The motion capture markers in the first hemisphere are positioned in a first pattern that is unique to the first hemisphere. The motion capture markers in the second hemisphere are positioned in a second pattern that is unique to the second hemisphere. The combination of the belt markers with the motion capture marker patterns can allow for the motion capture system to determine a position and orientation of the motion capture object at each frame. Embodiments disclosed herein include processes for capturing motion capture data for multiple motion capture objects simultaneously.

Advantageously, in certain embodiments, the motion capture process does not suffer from the previously described problems and can provide more accurate data with less data loss compared to other solutions. Further the use of the motion capture patterns enables the creation of a motion capture system that can capture symmetrical and spherical objects, which can be important for some desired MOCAP actions that may include movement and tracking of the motion capture objects within the motion capture environment.

Although motion capture may be used with other types of objects, to simplify discussion and not to limit the present disclosure, this disclosure will focus on spherical objects. However, it should be understood that certain embodiments disclosed herein may be used to capture the movement of some nonspherical shapes, such as a football or rugby ball.

Example Motion Capture Environment

FIG. 1 illustrates an embodiment of a motion capture environment 100 that can implement one or more embodiments of a motion capture system. The motion capture environment 100 may include a motion capture system 120. Further, the motion capture environment 100 may include a user computing system 110 that is separate from the motion capture system 120 or, in some embodiments, may be included as part of the motion capture system 120.

The motion capture system 120 may include one or more motion capture objects 122 that can include a plurality of belt markers 124, motion capture markers 126, and, optionally, sensors 128. The motion capture markers 126 and belt markers 124 can be used to determine a location of the motion capture object 122 within a coordinate space. The motion capture markers 126 can be positioned in defined patterns on hemispheres of the motion capture object 122. The belt marker 124 can be configured to delineate the boundary of the hemispheres of the motion capture object 122. The motion capture markers 126 and belt markers 124 of the motion capture object 122 may be used to determine a location and an orientation of the motion capture object 122 within a coordinate space of the motion capture environment as will be further described herein.

The motion capture system 120 may include one or more motion capture cameras 134. The motion capture cameras 134 can capture motion capture objects 122 and persons 102 within a particular area or motion capture environment. In some embodiments, different systems within the motion capture system 120 may be responsible for recording the movement or motions of different parts of the body of the person 102 (e.g., feet) and the motion capture object 122. For example, the motion capture cameras 134 may determine the location of different parts of the body of the person 102 and motion characteristics of the motion capture object 122. Further, different movements made by the person 102 and object 122 may be recorded by multiple cameras 134 and from different angles. The motion capture system 120 can use a global timer 136 to track the timing of the motion capture data and facilitate synchronization of the motion capture data from multiple motion capture cameras 134. The global timer 136 can associate timing data with different motion capture data obtained by the one or more cameras of the motion capture system 120 including motion capture data associated with the person 102 and the motion capture object 122.

In some embodiments, the motion capture object 122, optionally, may include one or more sensors 128 embedded within the object 122. In some embodiments, the sensors may include an inertial measurement unit (IMU). The IMU may be or may include an accelerometer. Alternatively, or in addition, the IMU may be a gyroscope and/or magnetometer designed for several axes of measurement, such as 3, 6, or 9 axes of measurement. The IMU can be disposed within or attached to the of the motion capture object 122 and can be used to provide additional motion data. However, noise associated with the sensor can cause the orientation data to be unreliable. In certain embodiments, the motion capture object 122 may include one or more IMUs enabling acquisition of a greater amount of motion data that can be used to help determine the location and/or orientation of the motion capture object 122.

In some cases, the sensor(s) 128 may communicate directly with another system, such as the motion capture object processing system 132. The motion capture object 122 may wirelessly communicate with system via the network 104. Although illustrated as part of the motion capture system 120, the network 104 may be independent of or external to the motion capture system 120. Alternatively, the motion capture system 120 may include a portion of the network 104 and another portion of the network 104 may be external to the motion capture system 120.

The motion capture system 120 may further include a motion capture video processor 140. The motion capture video processor 140 may include a system for generating motion capture video or motion capture clips based at least in part on motion capture data. This motion capture data may include the motion capture data generated by the motion capture object 122, motion capture data generated by the motion capture object processing system 132, motion capture data captured or determined by the motion capture cameras 134, and/or motion capture data generated by the motion capture video processor 140.

The motion capture markers 126 and belt markers 124 are recorded are tracked by the motion capture cameras 134. However, the motion capture cameras 134 are not limited to monitoring the markers associated with the motion capture object 122 and may track additional motion capture markers attached to the person 102 in a motion capture suit (not shown). In some instances, a motion capture session may capture a plurality of motion capture objects 122 and a plurality of persons 102.

The motion capture video processor 140 may store the motion capture data and/or the motion capture clips generated based at least in part on motion capture data to motion capture repository 142. Further, in some embodiments, the motion capture object processing system 132 may store motion capture data obtained from the motion capture object 122 at the motion capture repository 142.

The motion capture system 120 may further include a motion capture server 146. The motion capture server 146 may be used to combine motion capture clips to create a motion capture animation. In some embodiments the motion capture clips may be of different portions of the person 102. For example, a motion capture clip relating to a soccer ball animation may be combined with a motion capture clip relating to movement of the foot and leg of the person 102 kicking the ball. In some embodiments, the motion capture server 146 may combine the different motion capture clips based at least in part on timing information applied to the different motion capture clips by the global timer 136.

The motion capture data obtained using the motion capture system 120, may be presented to a user of the user computing system 110. In some embodiments, the user computing system 110 may be a workstation or other computing system used by an animator or developer's interact with motion capture data obtained by the motion capture system 120. In other embodiments, the user computing system 110 may be a video game computer or a video game system that can play animation generated based at least in part on the data obtained by the motion capture system 120 as part of a video game.

The user computing system 110 may include hardware and software components for establishing communication with another computing system, such as the motion capture system 120, over a communication network 104. For example, the user computing system 110 may be equipped with networking equipment and network software applications (for example, a web browser) that facilitate communications via a network (for example, the Internet) or an intranet. The user computing system 110 may include a number of local computing resources, such as central processing units and architectures, memory, mass storage, graphics processing units, communication network availability and bandwidth, and so forth. Further, the user computing system 110 may include any type of computing system capable of performing processes associated with the motion capture system 130. In some embodiments, the user computing system 110 may include one or more of the embodiments described below with respect to FIG. 5.

The network 104 can include any type of communication network. For example, the network 104 can include one or more of a wide area network (WAN), a local area network (LAN), a cellular network, an ad hoc network, a satellite network, a wired network, a wireless network, and so forth. Further, in some cases, the network 104 can include the Internet. Moreover, although illustrated as part of the motion capture system 120, the network 104 may be independent of or external from the motion capture system 120.

Example Motion Capture Object

Figure 2A:
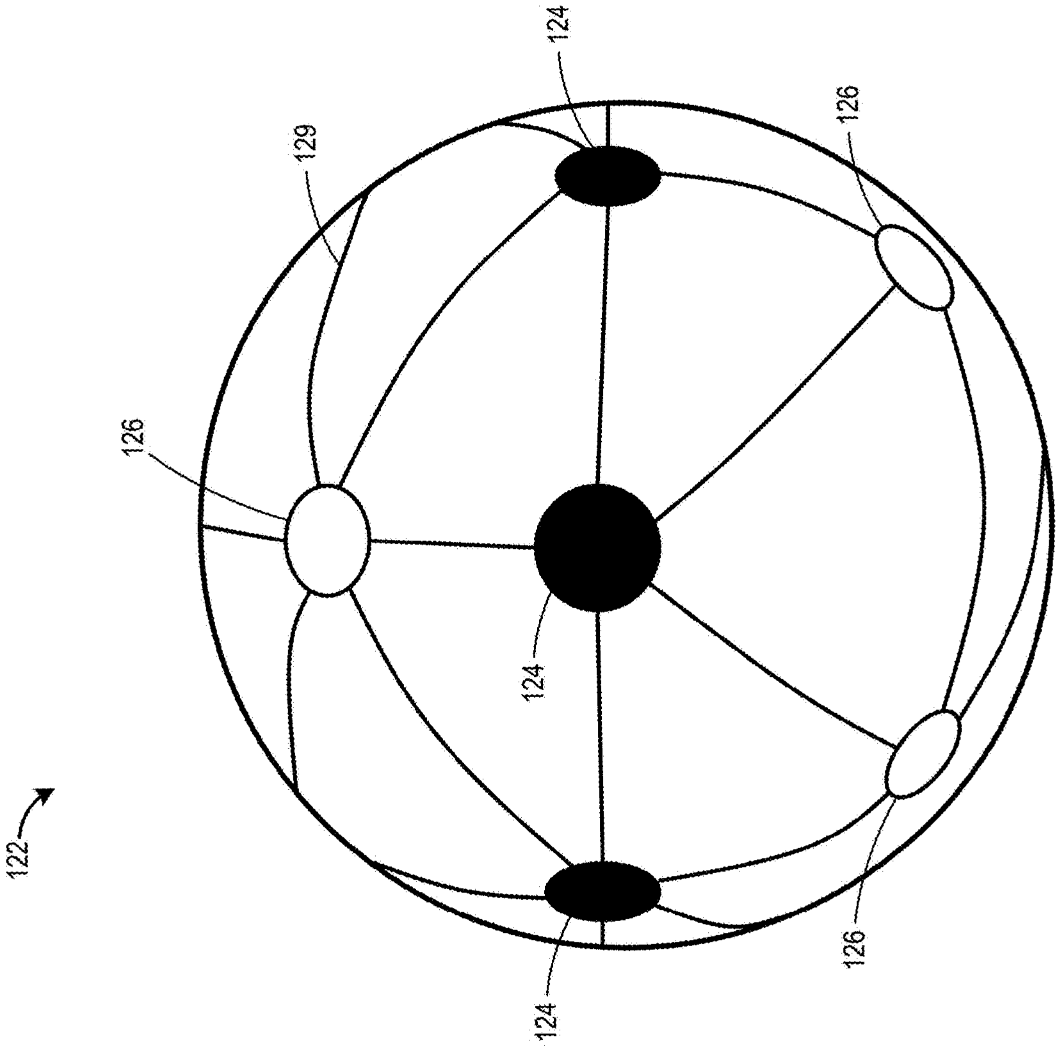
FIGS. 2A-2C illustrate an embodiment of a motion capture pattern for a motion capture object for use within the motion capture environment of FIG. 1.
Figure 2C:
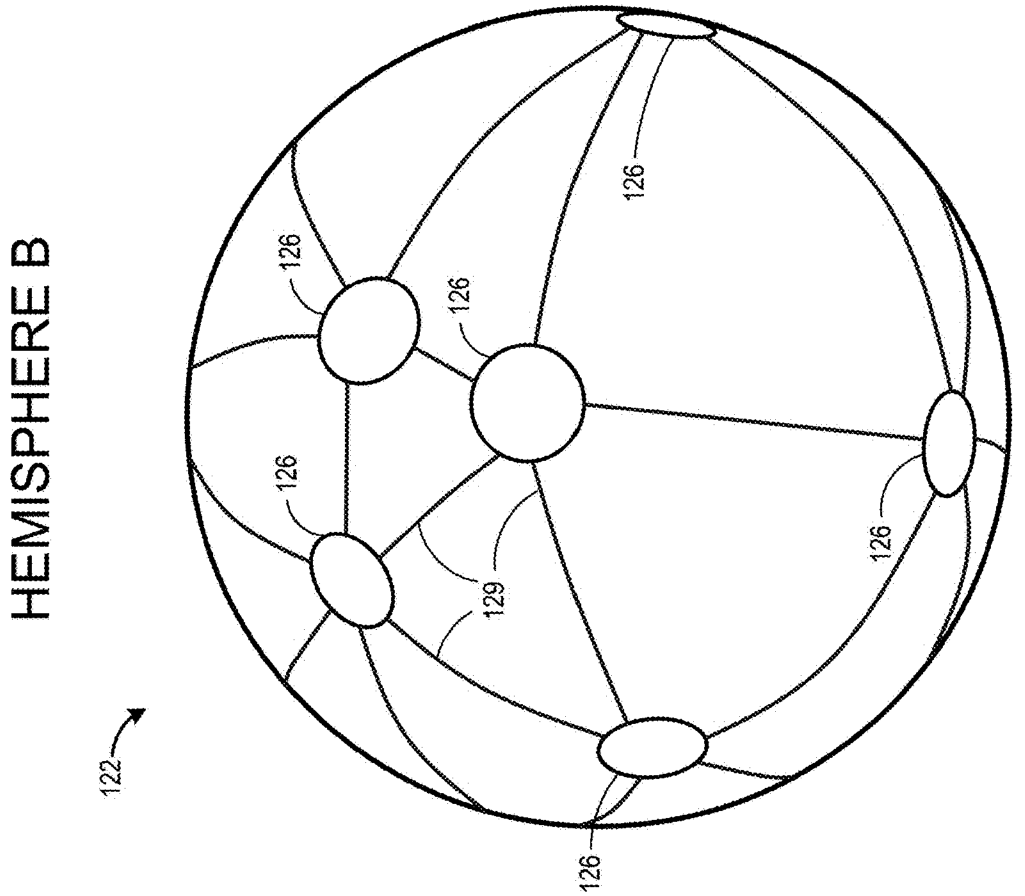
Figure 2B:
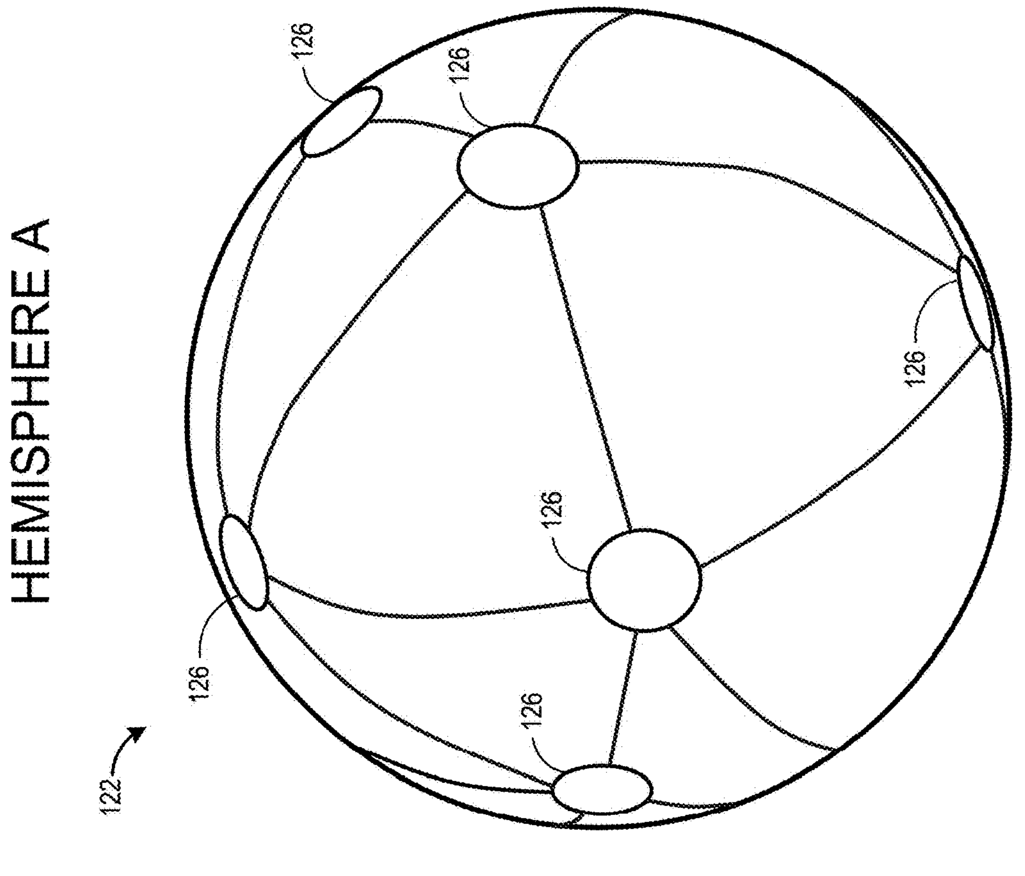

FIGS. 2A-2C illustrates an example embodiment of a motion capture object 122. The motion capture object 122 can include a plurality of belt markers 124, motion capture markers 126, and guidelines 129. The motion capture markers 126 and belt markers can be used to determine a location of the motion capture object 122 within a coordinate space. The motion capture markers 126 can be positioned in defined patterns on hemispheres of the motion capture object 122. The belt marker 124 can be configured to delineate the boundary of the hemispheres of the motion capture object 122. The motion capture markers 126 and belt markers 124 of the motion capture object 122 may be used to determine a location and an orientation of the motion capture object 122 within a coordinate space of the motion capture environment.

In FIG. 2A, the motion capture object 122 122 is positioned to show a portion of hemisphere A (illustrated in FIG. 2B) and a portion of hemisphere B (illustrated in FIG. 2C). The belt markers 124 are positioned to separate the hemispheres of the motion capture object 122. The illustrated motion capture object 122 122 is a spherical object. In some embodiments, the motion capture object 122 can be a non-spherical object that can be divided into symmetric hemispheres, such as a rugby ball or a football.

A spherical object presents difficult challenges to the motion capture system during a capture session. Due to the nature of the spherical shape, the motion capture system 130 has a difficult time determining orientation of the motion capture object 122. Accordingly, the motion capture data acquired during a motion capture session can provide the position of the motion capture object 122 within the environment but cannot provide the orientation, and motion characteristics derived from orientation information, such as an angle of rotation, a rotational speed, and/or other characteristics associated with the orientation and position of the motion capture object 122 in the motion capture space.

In order to address these problems, the motion capture object 122 is divided into hemispheres by the belt markers 124. By dividing the motion capture object 122 into hemispheres, an asymmetry can be created on the motion capture object 122 using the motion capture marker 126 that can be used to determine the orientation of the motion capture object 122. Though the discussion herein illustrates hemispheres of the motion capture object 122 that are created to divide the motion capture object 122 into generally equal halves, the division between the hemispheres does not necessarily need to be equal. It is contemplated that the belt markers can be used to divide the motion capture object 122 into unequal portions for purposes of creating an asymmetry and distinct patterns that the motion capture system 130 can use to determine orientation of the motion capture object 122.

Figure 3:
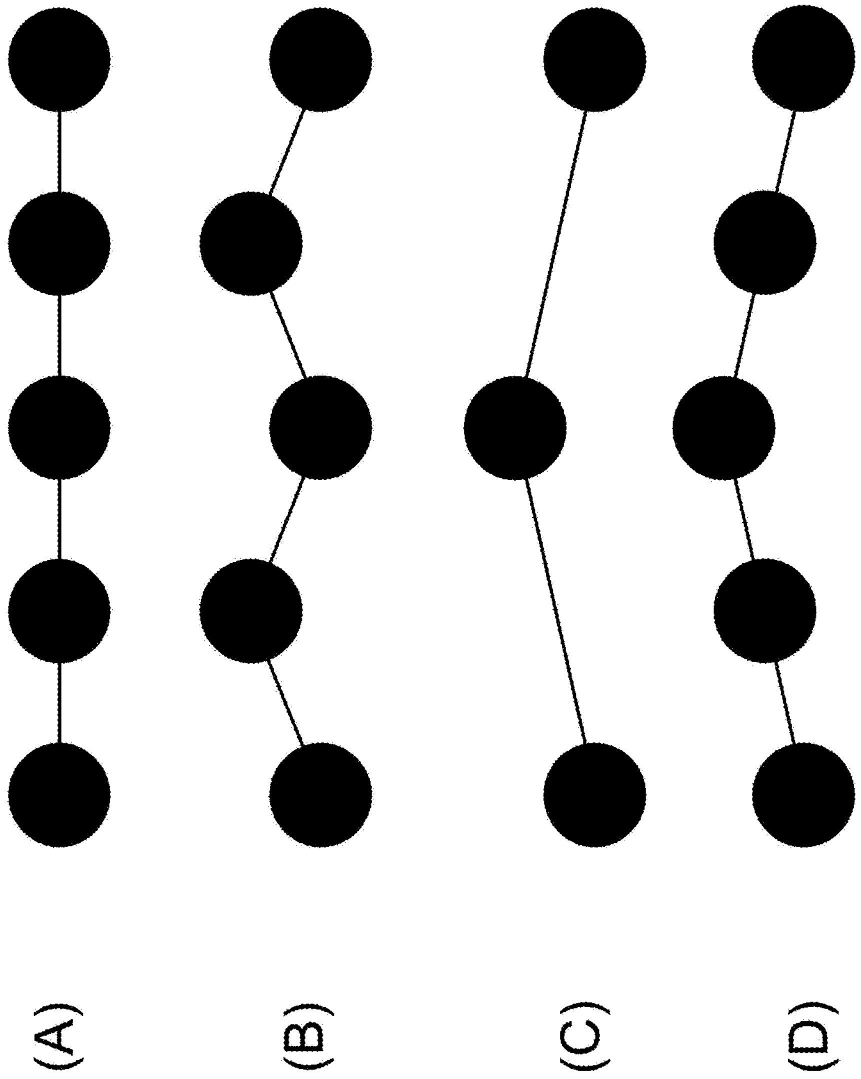
FIG. 3 illustrates embodiments of belt patterns for a motion capture object for use within the motion capture environment of FIG. 1.

The belt markers 124 can be positioned in a defined pattern around the motion capture object 122. The belt markers 124 create a division between the hemispheres. The belt markers 124 can be a different shape, size, color, and material than the motion capture markers 126. For example, in the illustrated embodiment, the belt markers 124 are dark and the motion capture markers 126 are light. The belt markers 124 may be different types of materials having different material characteristics, such as reflectivity. In some embodiments, the belt markers 124 and the motion capture markers 126 can be the same be a different shape, size, color, and/or material. The size of the belt markers 124 and the motion capture markers 126 can be limited by the surface area and a minimum size required for the motion capture system 130 to capture and process the motion capture data. Adding too many markers can result in degraded performance and unnecessary processing to achieve the same results. In the illustrated example, the belt markers 124 are positioned in a line around a middle line of the motion capture object 122. Different belt marker 124 patterns can be used to further differentiate the patterns that can be used on the motion capture object 122. FIG. 3 illustrated additional belt marker 124 patterns that can be used. The patterns can be similar to stitching patterns, which can be used to create symmetric hemispheres without having the belt markers 124 positioned on a centerline of the motion capture object 122.

FIGS. 2B and 2C illustrate embodiments of motion capture marker 126 patterns for the motion capture object 122. Each hemisphere can have a unique pattern of motion capture markers 126 relative to the opposite hemisphere. The arrangement of the patterns can use shapes, such as triangles, to create distinct patterns of asymmetry. The motion capture object 122 includes guidelines, which can be used to provide a visual indication of the positioning of the motion capture markers 126. For example, in hemisphere A, different size and types of triangles can by seen by the guidelines 129 between the motion capture markers 126. Hemisphere B has smaller triangles, as compared to hemisphere A, which creates a different pattern and identity for the hemisphere. The guidelines 129 can be optional aspects of the motion capture object 122, and can be used by a technician to position the motion capture markers 126 on the hemisphere in the correct pattern. In the illustrated examples in FIGS. 2B-2C, the hemispherical patterns for the motion capture markers 126 are created using triangles having different sizes and shapes. This system can allow for a person to manually create a pattern that is distinct from other patterns and place them on the motion capture object 122. In some instances, a computing system can be used automatically compute unique patterns using one or more algorithms for placement of the motion capture markers 126 on the motion capture objects 122. The number and size of the motion capture markers 126 and belt markers 124 can limit how many can be placed on the object. The resolution of the motion capture cameras can be one of the bottlenecks that limit size of the motion capture object 122. For example, the smaller a motion capture object 122 the smaller the markers need to be in order to define a distinct pattern, and the higher the resolution of the motion capture cameras. The markers need to be sized such that the motion capture camera can identify positioning of individual markers on the motion capture object 122 and identify the pattern of the markers on the motion capture object 122.

Example Motion Capture Session

Figure 4:
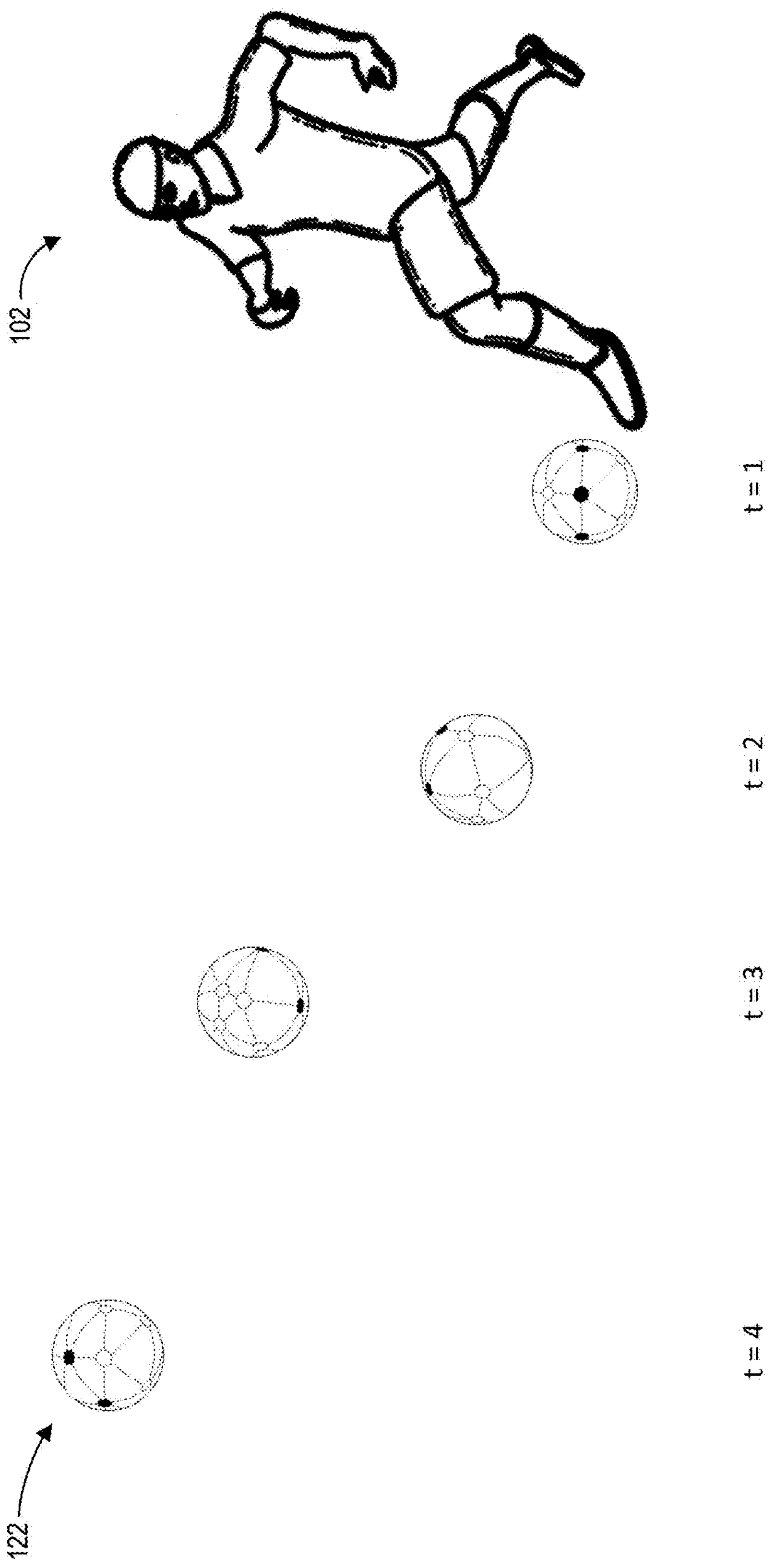
FIG. 4 illustrates an example of a motion capture object with motion capture patterns during a motion capture session within the motion capture environment of FIG. 1.

FIG. 4 illustrates a simplified example of a motion capture session. In the example instance the motion capture system 130 is generating motion capture data during a motion capture session. The motion capture session includes a person 102 and a motion capture object 122 122. FIG. 4 illustrates four different time increments (i.e., t=1, 2, 3, 4) during the motion capture session. At each time increment the motion capture system 130 capture motion capture data associated with the session. Each time increment may be a single frame, or it may be a plurality frames. The motion capture data can include a data associated with the motion capture object 122 and the person 102. The motion capture system 130 can capture data associated with the person 102. For example, the person could have a motion capture suit with motion capture markers 126 that identify the positions of portions of the body (e.g., legs and feet). As illustrated in FIG. 4, the orientation of the soccer ball is different at each time increment. The motion capture system 130 can be configured to determine the position and orientation of the ball at each increment.

Additionally, even though FIG. 4 illustrates a single point of view for capturing the session, multiple motion capture cameras are used to capture the motion capture objects 122 from a plurality of different angles. In some embodiments, a plurality of motion capture cameras can be used to capture the motion capture object 122 from at least three different points of view to generate motion capture data capable of determining position and orientation of the motion capture object 122. The motion capture system 130 synchronizes the motion capture data captured by each motion capture camera. The motion capture system 130 can use a global timer 136 and/or other systems to synchronize the motion capture data at each time increment.

The motion capture system 130 can learn and assign an identity to each motion capture object 122. For each motion capture object 122, the motion capture system 130 can determine use the motion capture marker 126 patterns on each hemisphere with the belt marker 124 pattern to determine an orientation of the motion capture object 122. At each time increment, the motion capture system 130 can analyze the positioning of the belt markers 124 and the motion capture markers 126 to determine the identity and motion characteristics of the motion capture object 122. The motion characteristics can include characteristics based on the motion capture environment, such as an x, y, z, position within a cartesian coordinate system, and angular positions such as, yaw, pitch, and roll. The motion characteristics and also include derived motion characteristics, such as speed and angle of rotation of the motion capture object 122.

When there are multiple motion capture objects 122 of the same type (e.g., multiple soccer balls), the motion capture system 130 can learn the identity of each motion capture object 122. The identity of a motion capture object 122 can be based on the pattern on each hemisphere of the motion capture object 122 and belt pattern. In some embodiments, the motion capture system 130 may learn the identity of each motion capture object 122 prior to a motion capture session. In some embodiments, the motion capture system 130 may identify differences between the motion capture objects 122 during the motion capture session. The motion capture system 130 can be configured to track multiple motion capture objects 122 simultaneously and assign unique identifiers to each motion capture object 122. The motion capture system 130 can generate and output the motion characteristics of the motion capture objects 122. In some embodiments, one or more sensors may be incorporated into the motion capture object 122 to provide additional motion characteristics associated with the motion capture object 122.

In some embodiments, the motion capture server 146 may provide the computing system 110 with additional motion capture data, such as body or facial motion capture data obtained from other motion capture systems. The computing system 110 may create one or more animations from motion capture data received from the motion capture server 146 at any point in time when the motion capture data is available. In some embodiments, to enable the creation of animations at future point in time, motion capture data may be associated with timing information obtained from a global timer, such as the global timer 136. However, in some embodiments, it is desired to view motion capture clips or animation based on motion capture data in real time or near real-time. For example, it may be desirable to view motion capture clips based on motion capture data in real time to determine whether the data being captured is sufficient to create the desired motion capture clips or animations based on the motion capture clips. To enable a user to view motion capture clips in real-time or near real-time, the computing system 110 may provide the motion capture data or motion capture clips based on a motion capture data to a real-time visualization system. The real-time visualization system may comprise a display of the computing system 110, an additional computing system configured to output obtained motion capture data or an animation based on the obtained motion capture data, and/or a user interface configured to present the motion capture data or an animation based on the obtained motion capture data to a user. The motion capture system 120 can store the motion capture data and/or motion capture clips in data repository 144. In some embodiments, the data repository 144 stores additional body or facial motion capture data received from other motion capture systems.

Example Motion Capture Process for Motion Capture Object

Figure 5:
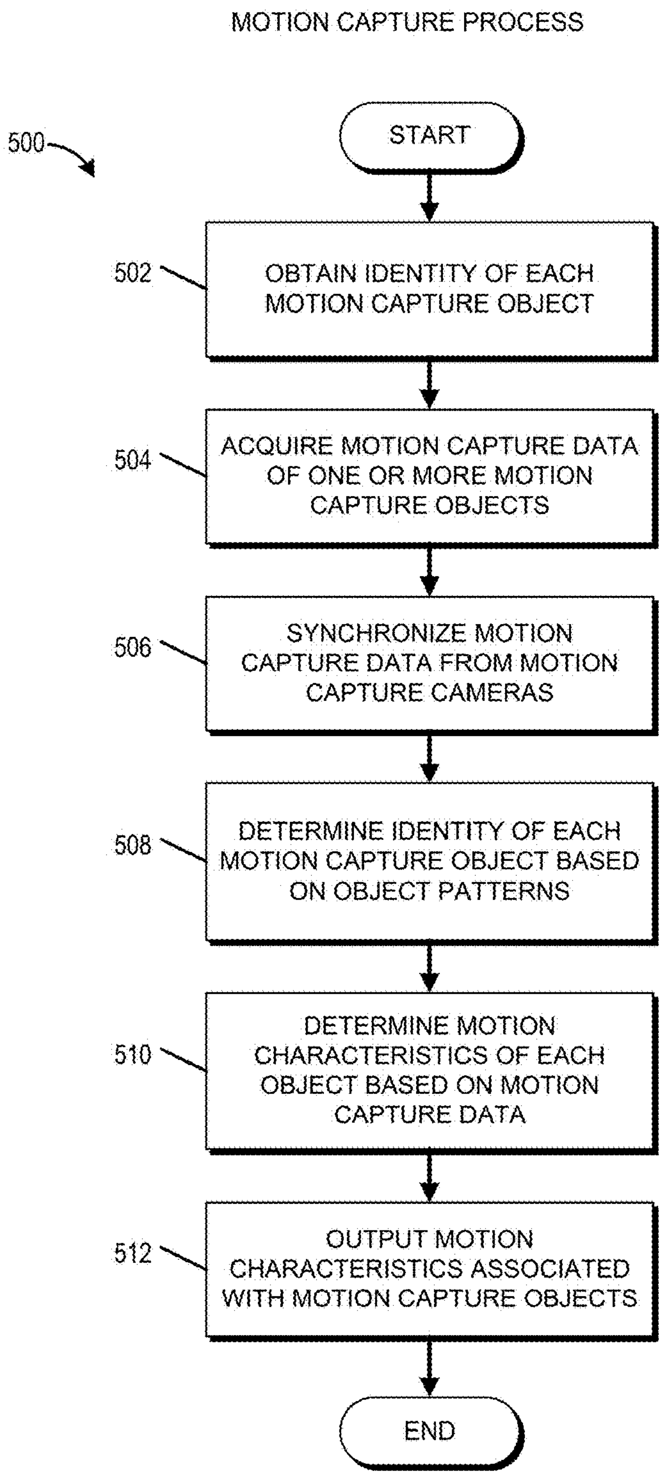
FIG. 5 presents a flowchart of an embodiment of a motion capture process for a motion capture object.

FIG. 5 presents a flowchart of an embodiment of a motion capture process for a motion capture object. The process 500 can be implemented by any system that can capture motion capture data for a motion capture object 122. The process 500, in whole or in part, can be implemented by, for example, a motion capture system 120, a motion capture object 122, a motion capture object processing system 132, a motion capture video processor 140, a motion capture server 146, or a user computing system 110, among others. Although any number of systems, in whole or in part, can implement the process 500, to simplify discussion, the process 500 will be described with respect to particular systems. Further, the process 500, or particular operations of the process 500 may be performed with multiple motion capture object 122 simultaneously. Although the process 500 is primarily described with respect to a spherical motion capture object 122, in certain embodiments, the process 500 may be used for non-spherical motion capture objects, such as a football.

The process 500 begins at block 502 where the motion capture system 130, obtains the identity of each motion capture object 122. The motion capture system 130 can learn the identity of each motion capture object 122. The identity of a motion capture object 122 can be based on the pattern on each hemisphere of the motion capture object 122 and belt pattern. In some embodiments, the motion capture system 130 may learn the identity of each motion capture object 122 prior to a motion capture session. In some embodiments, the motion capture system 130 may identify differences between the motion capture objects 122 during the motion capture session.

At block 504, the motion capture object processing system 132 acquires motion capture of one or more motion capture objects during a motion capture session. The motion capture session may include multiple motion capture objects and multiple persons 102. The motion capture system 130 can acquire motion capture data associated with the motion capture objects 122. The motion capture data can include the positions of each motion capture marker 126 and belt marker 124 acquired by each camera during the motion capture session. The resolution of the motion capture cameras can determine how much motion capture data can be collected during the motion capture session. A plurality of motion capture cameras can be used to capture the motion capture object 122 from at least three different points of view to generate sufficient motion capture data to determine orientation of the motion capture object 122.

At block 506, the motion capture system 130 synchronizes the motion capture data from multiple motion capture cameras. The motion capture system 130 can use a global timer 136 and/or other systems to synchronize the motion capture data at each time increment. For example, the motion capture object processing system 132 can access a global time code from the global timer 136. The motion capture object processing system 132 can associate or otherwise match the motion capture data obtained by the motion capture object 122 from each camera within the motion capture session. Additionally, the motion capture data associated with a plurality of persons 102 can be obtained and synchronized with the motion capture date of the motion capture objects 122.

At block 508, the motion capture object processing system 132 can determine the identity of each motion capture object 122 based on the capture object patterns and the motion capture data. At each time increment of the motion capture data, the motion capture system 130 can analyze the positioning of the belt markers 124 and the motion capture markers 126 to identify the motion capture object 122. In some such embodiments, an identifier corresponding to the motion capture object 122 is used for each motion capture object 122. As each motion capture object 122 has a unique pattern, the motion capture system 130 knows the patterns and uses the known patterns to filter the data and segregate the data for each motion capture object 122 based on the identity of the motion capture object 122.

At block 510, the motion capture object processing system 132 can determine motion characteristics of each motion capture object 122 based on the identity and the motion capture data. The motion capture camera(s) 134 detects position of motion capture marker(s) 126 and belt markers 124 attached to the motion capture object 122. Detecting the location of the motion capture marker 126 and belt markers 124 can enable detection of a location and orientation of the motion capture object 122 in a coordinate space.

The motion characteristics can include characteristics based on the motion capture environment, such as an x, y, z, position within a cartesian coordinate system, and angular positions such as, yaw, pitch, and roll. The motion characteristics and also include derived motion characteristics, such as speed and angle of rotation of the motion capture object 122.

In some embodiments, motion capture marker(s) 126 may be used with one or more sensors, such as an inertial measurement unit (IMU). The IMU may be or may include an accelerometer. The IMU can also be disposed within or attached to the of the motion capture object 122 and can be used to provide additional motion data. This motion data from the IMU can be combined with the motion data to determine location and orientation of the motion capture object 122. Although it is possible to determine both location and orientation in a coordinate space of the motion capture object 122 using motion capture markers 126 and belt markers 124 without an IMU, in certain embodiments, the motion capture object 122 may include one or more IMUs enabling acquisition of a greater amount of motion data that can be used to help determine the location and/or orientation of the motion capture object 122.

At block 512, the motion capture object processing system 132 output the motion characteristics and motion capture data associated with the motion capture objects 122. The motion capture data may correspond to values that can be mapped to one or more animation models to create an animation of the motion capture object 122. Alternatively, or in addition, outputting the motion characteristics may include storing, at the motion capture repository 144, a motion capture clip or an animation corresponding to or generated based at least in part on the motion capture data of the motion capture object 122. In some embodiments, outputting the motion characteristics of the motion capture object 122 may include outputting an animation or motion capture clip on a display of a computing system, such as the user computing system 110, for presentation to a user.

Example Hardware Configuration of Computing System

Figure 6:
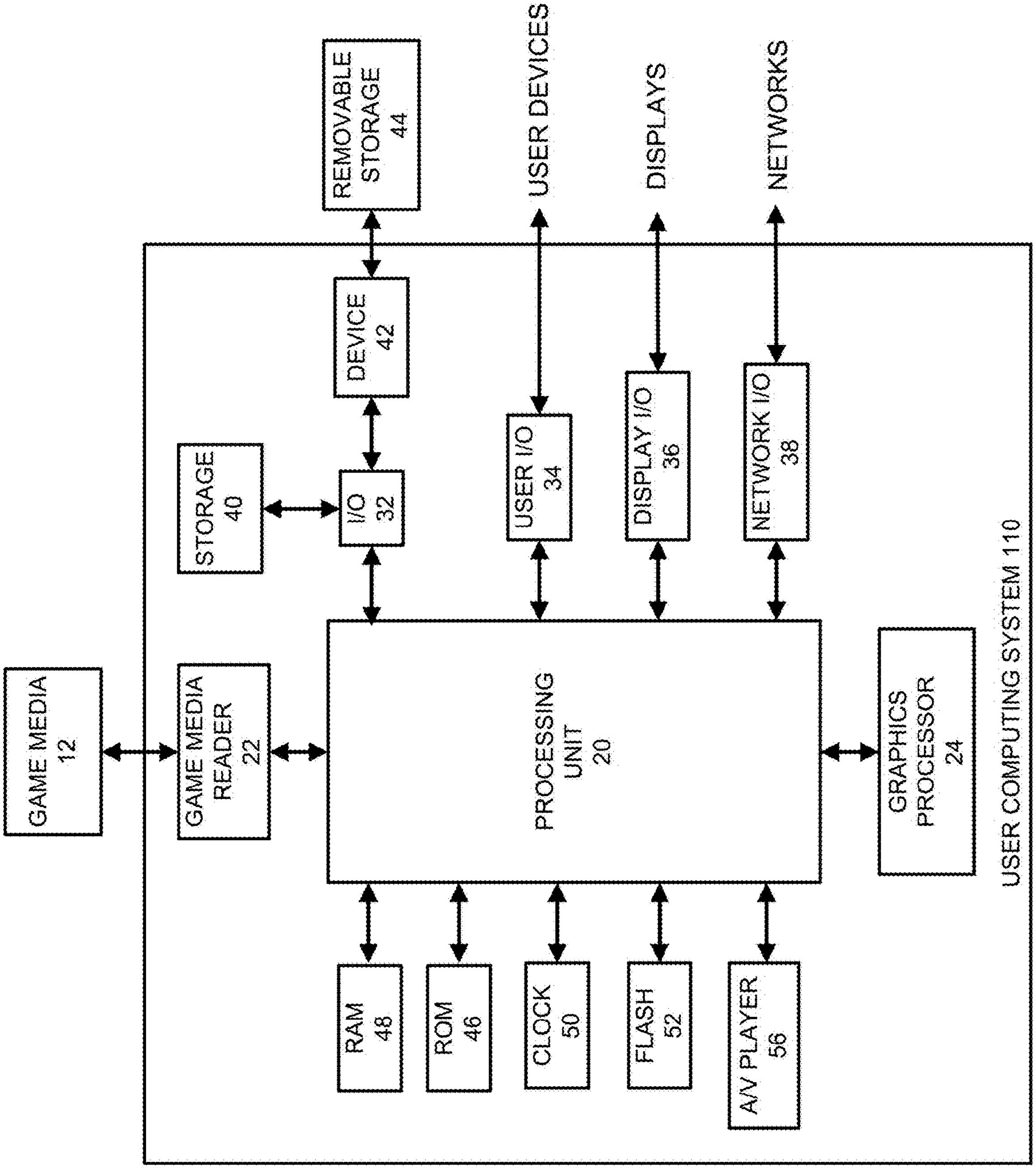
FIG. 6 illustrates an embodiment of a hardware configuration for the user computing system.

FIG. 6 illustrates an embodiment of a hardware configuration for the user computing system 110. Other variations of the user computing system 110 may be substituted for the examples explicitly presented herein, such as removing or adding components to the user computing system 110. The user computing system 110 may include a dedicated game device, a smart phone, a tablet, a personal computer, a desktop, a laptop, a smart television, a car console display, and the like.

As shown, the user computing system 110 includes a processing unit 20 that interacts with other components of the user computing system 110 and also components external to the user computing system 110. A game media reader 22 may be included that can communicate with game media 12. Game media reader 22 may be an optical disc reader capable of reading optical discs, such as CD-ROM or DVDs, or any other type of reader that can receive and read data from game media 12. In some embodiments, the game media reader 22 may be optional or omitted. For example, game content or applications may be accessed over a network via the network I/O 38 rendering the game media reader 22 and/or the game media 12 optional.

The user computing system 110 may include a separate graphics processor 24. In some cases, the graphics processor 24 may be built into the processing unit 20, such as with an APU. In some such cases, the graphics processor 24 may share Random Access Memory (RAM) with the processing unit 20. Alternatively, or in addition, the user computing system 110 may include a discrete graphics processor 24 that is separate from the processing unit 20. In some such cases, the graphics processor 24 may have separate RAM from the processing unit 20. Further, in some cases, the graphics processor 24 may work in conjunction with one or more additional graphics processors and/or with an embedded or non-discrete graphics processing unit, which may be embedded into a motherboard and which is sometimes referred to as an on-board graphics chip or device.

The user computing system 110 also includes various components for enabling input/output, such as an I/O 32, a user I/O 34, a display I/O 36, and a network I/O 38. As previously described, the input/output components may, in some cases, including touch-enabled devices. The I/O 32 interacts with storage element 40 and, through a device 42, removable storage media 44 in order to provide storage for the user computing system 110. Processing unit 20 can communicate through I/O 32 to store data, such as game state data and any shared data files. In addition to storage 40 and removable storage media 44, the user computing system 110 is also shown including ROM (Read-Only Memory) 46 and RAM 48. RAM 48 may be used for data that is accessed frequently, such as when a game is being played, or for all data that is accessed by the processing unit 20 and/or the graphics processor 24.

User I/O 34 is used to send and receive commands between processing unit 20 and user devices, such as game controllers. In some embodiments, the user I/O 34 can include touchscreen inputs. As previously described, the touchscreen can be a capacitive touchscreen, a resistive touchscreen, or other type of touchscreen technology that is configured to receive user input through tactile inputs from the user. Display I/O 36 provides input/output functions that are used to display images from the game being played. Network I/O 38 is used for input/output functions for a network. Network I/O 38 may be used during execution of a game, such as when a game is being played online or being accessed online.

Display output signals may be produced by the display I/O 36 and can include signals for displaying visual content produced by the user computing system 110 on a display device, such as graphics, user interfaces, video, and/or other visual content. The user computing system 110 may comprise one or more integrated displays configured to receive display output signals produced by the display I/O 36, which may be output for display to a user. According to some embodiments, display output signals produced by the display I/O 36 may also be output to one or more display devices external to the user computing system 110.

The user computing system 110 can also include other features that may be used with a game, such as a clock 50, flash memory 52, and other components. An audio/video player 56 might also be used to play a video sequence, such as a movie. It should be understood that other components may be provided in the user computing system 110 and that a person skilled in the art will appreciate other variations of the user computing system 110.

Program code can be stored in ROM 46, RAM 48, or storage 40 (which might comprise hard disk, other magnetic storage, optical storage, solid state drives, and/or other non-volatile storage, or a combination or variation of these). At least part of the program code can be stored in ROM that is programmable (ROM, PROM, EPROM, EEPROM, and so forth), in storage 40, and/or on removable media such as game media 12 (which can be a CD-ROM, cartridge, memory chip or the like, or obtained over a network or other electronic channel as needed). In general, program code can be found embodied in a tangible non-transitory signal-bearing medium.

Random access memory (RAM) 48 (and possibly other storage) is usable to store variables and other game and processor data as needed. RAM is used and holds data that is generated during the play of the game and portions thereof might also be reserved for frame buffers, game state and/or other data needed or usable for interpreting user input and generating game displays. Generally, RAM 48 is volatile storage and data stored within RAM 48 may be lost when the user computing system 110 is turned off or loses power.

As user computing system 110 reads game media 12 and provides a game, information may be read from game media 12 and stored in a memory device, such as RAM 48. Additionally, data from storage 40, ROM 46, servers accessed via a network (not shown), or removable storage media 46 may be read and loaded into RAM 48. Although data is described as being found in RAM 48, it will be understood that data does not have to be stored in RAM 48 and may be stored in other memory accessible to processing unit 20 or distributed among several media, such as game media 12 and storage 40.

It is to be understood that not necessarily all objects or advantages may be achieved in accordance with any particular embodiment described herein. Thus, for example, those skilled in the art will recognize that certain embodiments may be configured to operate in a manner that achieves, increases, or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A motion capture object comprising:

a first hemisphere;

a second hemisphere;

a plurality of belt markers, wherein the plurality of belt markers are configured to divide the first hemisphere from the second hemisphere, wherein each of the belt markers has a first visual appearance;

a first plurality of motion capture markers, wherein the first plurality of motion capture markers are positioned in a first configuration on the first hemisphere, wherein each of the motion capture markers of the first plurality has a second visual appearance;

a second plurality of motion capture markers, wherein the second plurality of motion capture markers are positioned in a second configuration on the second hemisphere, wherein the first configuration and the second configuration are different, wherein each of the motion capture markers of the second plurality has the second visual appearance;

wherein the plurality of belt markers, the first plurality of motion capture markers, and the second plurality of motion capture markers are configured to be detectable by motion capture cameras.

2. The motion capture object of claim 1, wherein the first visual appearance is a first color and the second visual appearance is a second color.

3. The motion capture object of claim 1, wherein the first visual appearance and the second visual appearance have different reflectivity.

4. The motion capture object of claim 1, further comprising guidelines connecting at least a subset of the first plurality of the motion capture markers with each other and the plurality of belt markers, and the guidelines connecting at least a subset of the second plurality of the motion capture markers with each other and the plurality of belt markers.

5. The motion capture object of claim 1, wherein the motion capture object is symmetrical about at least one centerline.

6. The motion capture object of claim 5, wherein the motion capture object is spherical.

7. The motion capture object of claim 5, wherein the motion capture object is non-spherical.

8. The motion capture object of claim 1, wherein the motion capture object further comprises a sensor configured to determine motion characteristics associated with the motion capture object.

9. The motion capture object of claim 1, wherein the first configuration is a first plurality of triangles, and wherein the second configuration is a second plurality of triangles.

10. The motion capture object of claim 1, wherein the first configuration and the second configuration are generated based on computer-based algorithm.

11. The motion capture object of claim 1, wherein the first visual appearance and the second visual appearance are the same.

12. A computer-implemented motion capture method, the method comprising:

acquiring motion capture data associated with a motion capture object having a first hemisphere and a second hemisphere, wherein the motion capture object comprises:

a plurality of belt markers, wherein the plurality of belt markers are configured to divide the first hemisphere from the second hemisphere, wherein each of the belt markers has a first visual appearance;

a first plurality of motion capture markers, wherein the first plurality of motion capture markers are positioned in a first configuration on the first hemisphere, wherein each of the motion capture markers of the first plurality has a second visual appearance;

a second plurality of motion capture markers, wherein the second plurality of motion capture markers are positioned in a second configuration on the second hemisphere;

synchronizing the motion capture data from a plurality of motion capture cameras;

determining motion characteristics associated with the motion capture object based at least in part on the plurality of belt markers, the first plurality of motion capture markers, and the second plurality of motion capture markers; and outputting the motion characteristics associated with the motion capture object.

13. The method of claim 12, further comprising obtaining an identity associated with the motion capture object based at least in part on the first configuration and the second configuration.

14. The method of claim 13, wherein the motion capture object is one of a plurality of motion capture objects, and wherein obtaining an identity associated with the motion capture object further comprises determining the identity of each of the motion capture objects of the plurality of motion capture objects.

15. The method of claim 14, wherein each motion capture object has a different first configuration and a different second configuration.

16. The method of claim 12, wherein synchronizing comprises accessing a global time code and associating the global time code with motion capture data associated with each of the plurality of motion capture cameras.

17. The method of claim 12, wherein the motion characteristics comprise a location and orientation of the motion capture object in a coordinate space orientation.

18. The method of claim 17, wherein the motion characteristics comprise derived motion characteristics including speed and rotation of the motion capture object.

19. The method of claim 12, further comprising receiving data from a sensor embedded in the motion capture object.

20. A non-transitory computer storage media storing instructions that when executed by a system of one or more processors, cause the one or more processors to perform operations comprising:

acquiring motion capture data associated with a motion capture object having a first hemisphere and a second hemisphere, wherein the motion capture object comprises:

a plurality of belt markers, wherein the plurality of belt markers are configured to divide the first hemisphere from the second hemisphere, wherein each of the belt markers has a first visual appearance;

a first plurality of motion capture markers, wherein the first plurality of motion capture markers are positioned in a first configuration on the first hemisphere, wherein each of the motion capture markers of the first plurality has a second visual appearance;

a second plurality of motion capture markers, wherein the second plurality of motion capture markers are positioned in a second configuration on the second hemisphere;

synchronizing the motion capture data from a plurality of motion capture cameras;

determining motion characteristics associated with the motion capture object based at least in part on the plurality of belt markers, the first plurality of motion capture markers, and the second plurality of motion capture markers; and outputting the motion characteristics associated with the motion capture object.

* * * * *